United States Patent
Adireddy et al.

(10) Patent No.: US 10,558,871 B2
(45) Date of Patent: Feb. 11, 2020

(54) SYSTEM AND METHOD FOR IMPROVING THE PERFORMANCE OF AN IN-VEHICLE SENSOR SYSTEM

(71) Applicant: Continental Automotive Systems, Inc., Auburn Hills, MI (US)

(72) Inventors: Ganesh Adireddy, Bloomfield Hills, MI (US); Javier Alcazar, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 16/141,293

(22) Filed: Sep. 25, 2018

(65) Prior Publication Data

US 2019/0095727 A1    Mar. 28, 2019

Related U.S. Application Data

(60) Provisional application No. 62/562,909, filed on Sep. 25, 2017.

(51) Int. Cl.
*G06K 9/00*    (2006.01)
*G02B 26/10*    (2006.01)
*G06K 9/32*    (2006.01)

(52) U.S. Cl.
CPC ......... *G06K 9/00805* (2013.01); *G02B 26/10* (2013.01); *G06K 9/3241* (2013.01)

(58) Field of Classification Search
CPC ... G06K 9/00805; G06K 9/3241; G02B 26/10
USPC .......................................................... 348/148
See application file for complete search history.

(56) References Cited

U.S. PATENT DOCUMENTS

2013/0278769 A1* 10/2013 Nix ........................ H04N 7/18
348/148

* cited by examiner

*Primary Examiner* — Jeffery A Williams (57) ABSTRACT

A method of identifying an object includes setting scan parameters for scanning, with a sensor, objects in a field of view of the sensor; setting classification parameters for identifying objects scanned in the field of view of the sensor; controlling the sensor to scan for objects in the field of view using the scan parameters, and to identify any scanned objects based upon the classification parameters; receiving information relating to a first object which is not in the field of view but is expected to enter the field of view; modifying the scan parameters based upon the received information, controlling the sensor to scan based upon the modified scan parameters; and identifying the first object in the field of view. Responsive to identifying the first object, the method performs one or more actions so the vehicle avoids the first object.

20 Claims, 3 Drawing Sheets

FIG. 4

SYSTEM AND METHOD FOR IMPROVING THE PERFORMANCE OF AN IN-VEHICLE SENSOR SYSTEM

CROSS REFERENCE TO RELATED APPLICATION

The present application claims the benefit of U.S. provisional application 62/562,909, filed Sep. 25, 2017, entitled "SYSTEM AND METHOD FOR IMPROVING THE PERFORMANCE OF AN IN-VEHICLE SENSOR SYSTEM," the content of which is hereby incorporated by reference herein in its entirety.

FIELD OF INVENTION

The present invention generally relates to a safety system for a vehicle, and particularly to a system and method for more quickly responding to an object sensed by an in-vehicle sensor.

BACKGROUND

It is known for vehicles equipped with vision-based sensors to have a field of view in which objects are detected. In some instances, systems employing vision-based sensors do not have sufficient time to detect an object that has recently entered into the vehicle's field of view, identify the object and provide an opportunity for the vehicle or the vehicle's driver to react to the presence of the object. Accordingly, there is a need for an improved system in which a vehicle or driver thereof is provided sufficient time to respond to an object recently detected by the vision-based sensors.

SUMMARY

Example embodiments are generally directed to a method, system and software program for timely detecting, identifying and responding to objects entering the vehicle's field of view. In an example embodiment of a vehicle system including at least one sensor having at least one field of view, a method of identifying an object is disclosed, including: setting scan parameters for scanning, with the at least one sensor, objects in at least one field of view of the at least one sensor; setting classification parameters for identifying objects scanned in the at least one field of view of the at least one sensor; controlling the at least one sensor to scan for objects in the at least one field of view using the scan parameters, and to identify any scanned objects based upon the classification parameters; receiving information relating to a first object which is not in the at least one field of view of the at least one sensor but is expected to enter the at least one field of view thereof; modifying the scan parameters based upon the received information, and controlling the at least one sensor to scan based upon the modified scan parameters; detecting and identifying the first object in the at least one field of view, wherein the first object is identified in a shorter period of time, relative to the first object appearing in the at least one field of view of the at least one sensor, than a period of time to identify the first object without having modified the scan parameters; and responsive to identifying the first object, performing one or more actions so the vehicle avoids the first object.

The method may further include, following receiving the information, modifying the classification parameters based upon the received information, wherein identifying the first object is based upon the modified classification parameters. The information relating to the first object may identify the first object by object class, and modifying the classification parameters includes modifying the classification parameters to identify the first object with less processing time by the system than a processing time to classify the first object without the modified classification parameters. Modifying the classification parameter may include increasing a weight assigned to the object class in the information relating to the first object, relative to one or more weights of other object classes not included in the information relating to the first object.

The information relating to the first object may include location information thereof, the at least one sensor may include a plurality of sensors, each sensor having a field of view such that the at least one field of view includes a plurality of fields of view, and the method may further include identifying, based in part upon the location information of the first object, a first field of view from the fields of view in which the first object is expected to first appear, wherein modifying the scan parameters is based in part upon the identified first field of view. The method may further include identifying a region of interest in the first field of view based upon the location information, the region of interest defining a region within the first field of view in which the first object is expected to appear, and modifying the scan parameters is based in part upon the identified region of interest. Controlling the at least one sensor to scan includes more frequently scanning or otherwise accessing pixels of the sensor corresponding to the region of interest, relative to scanning pixels corresponding to other regions of the first field of view.

Controlling the at least one sensor to scan may include controlling the sensors to more frequently scan or otherwise access the sensor having the first field of view, relative to scanning and/or accessing other of the sensors.

In another example embodiment, a software program code product for a vehicle is disclosed, the program code product stored in non-transitory memory and including instructions which, when executed by a processor in the vehicle having at least one sensor, configure the processor to perform: setting scan parameters for scanning, with the at least one sensor, objects in at least one field of view of the at least one sensor; setting classification parameters for identifying objects scanned in the at least one field of view of the at least one sensor; controlling the at least one sensor to scan for objects in the at least one field of view using the scan parameters, and to identify any scanned objects based upon the classification parameters; receiving information relating to a first object which is not in the at least one field of view of the at least one sensor but is expected to enter the at least one field of view thereof; modifying the scan parameters based upon the received information, and controlling the at least one sensor to scan based upon the modified scan parameters; detecting and identifying the first object in the at least one field of view, wherein the first object is identified in a shorter period of time, relative to the first object appearing in the at least one field of view of the at least one sensor, than a period of time to identify the first object without having modified the scan parameters; and responsive to identifying the first object, taking action to avoid hitting the first object with the vehicle.

The instructions, when executed by the processor, may configure the process for, following receiving the information, modifying the classification parameters based upon the received information, wherein identifying the first object is based upon the modified classification parameters. The information relating to the first object identifies the first object by object class, and modifying the classification parameters may include modifying the classification parameters to identify the first object with less processing time by the system than a processing time to classify the first object without the modified classification parameters. Modifying the classification parameter may include increasing a weight assigned to the object class in the information relating to the first object, relative to one or more weights of other object classes not included in the information relating to the first object.

The information relating to the first object may include location information thereof, the at least one sensor may include a plurality of sensors, each sensor having a field of view such that the at least one field of view comprises a plurality of fields of view, and the processor may be further configured to identify, based in part upon the location information of the first object, a first field of view from the fields of view in which the first object is expected to first appear, wherein modifying the scan parameters is based in part upon the identified first field of view. The processor may be further configured to identify a region of interest in the first field of view based upon the location information, the region of interest defining a region within the first field of view in which the first object is expected to appear, and modify the scan parameters is based in part upon the identified region of interest. Controlling the at least one sensor to scan may include more frequently scanning or otherwise accessing pixels of the sensor corresponding to the region of interest, relative to scanning pixels corresponding to other regions of the first field of view.

Controlling the at least one sensor to scan may include more frequently scanning or otherwise accessing the sensor having the first field of view, relative to scanning and/or accessing other of the sensors.

In another example embodiment, a vehicle safety system configured for use in a vehicle is disclosed, including: a transceiver having a transmitter and a receiver to provide over-the-air communication; at least one sensor; and a processor and memory coupled to the processor, the processor coupled to the transceiver and the at least one sensor, and the memory having stored therein a software program having instructions which, when executed by the processor, configure the processor to perform: setting scan parameters for scanning, with the at least one sensor, objects in at least one field of view of the at least one sensor; setting classification parameters for identifying objects scanned in the at least one field of view of the at least one sensor; controlling the at least one sensor to scan for objects in the at least one field of view using the scan parameters, and to identify any scanned objects based upon the classification parameters; receiving information relating to a first object which is not in the at least one field of view of the at least one sensor but is expected to enter the at least one field of view thereof; modifying the scan parameters based upon the received information, and controlling the at least one sensor to scan based upon the modified scan parameters; detecting and identifying the first object in the at least one field of view, wherein the first object is identified in a shorter period of time, relative to the first object appearing in the at least one field of view of the at least one sensor, than a period of time to identify the first object without having modified the scan parameters; and responsive to identifying the first object, taking action to avoid the vehicle contacting the first object.

The processor may be further configured to perform, following receiving the information, modifying the classification parameters based upon the received information, wherein identifying the first object is based upon the modified classification parameters, and wherein the information relating to the first object identifies the first object by object class, and modifying the classification parameters comprises modifying the classification parameters to identify the first object with less processing time by the system than a processing time to classify the first object without the modified classification parameters.

The information relating to the first object may include location information thereof, the at least one sensor may include a plurality of sensors, each sensor having a field of view such that the at least one field of view includes a plurality of fields of view, and the processor may be further configured to perform identifying, based in part upon the location information of the first object, a first field of view from the fields of view in which the first object is expected to first appear, wherein modifying the scan parameters is based in part upon the identified first field of view.

Controlling the at least one sensor to scan may include more frequently scanning or otherwise accessing the sensor having the first field of view, relative to scanning or otherwise accessing other of the sensors.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiment(s) is merely exemplary in nature and is in no way intended to limit the invention, its application, or uses.

The example embodiments presented herein are generally directed to a safety system disposed in a vehicle which relies upon vehicle-to-vehicle (hereinafter "V2V") and/or vehicle-to-infrastructure (hereinafter "V2X", which includes communication between vehicles and infrastructure in both directions) communication for facilitating a faster process for sensing, detecting and identifying an object approaching the vehicle and/or the vehicle's path.

Figure 1:
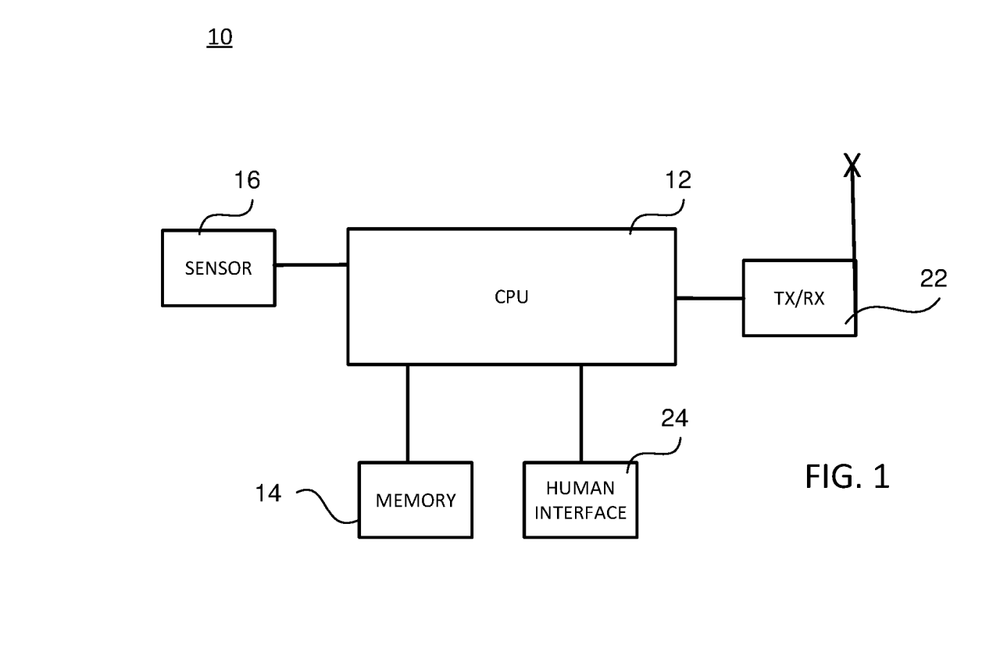
FIG. 1 is a block diagram of a vehicle safety system according to an example embodiment.

FIG. 1 illustrates a block diagram of a vehicle safety system 10 according to an example embodiment. Vehicle safety system 10 is configured to be installed in a motor vehicle. The system includes a central processing unit (CPU) 12 which includes at least one processor or processing device for executing program code instructions stored in nonvolatile memory 14. CPU 12 and memory 14 may form one or more controllers for a vehicle. Vehicle safety system 10 further includes a sensor network 16 having vision sensors disposed around the vehicle. Each sensor may be any type of sensor, such as a camera, and/or utilize any technology for sensing objects in the sensor's field of view, such as optical, radar, LiDAR, ultrasonics, etc. A transceiver 22, having a transmitter and receiver, is coupled to CPU 12 for use in communicating over the air interface. In an example embodiment, vehicle safety system 10 may utilize the Dedicated Short Range Communication (DSRC) protocol in communicating over the air interface. It is understood, however, that vehicle safety system 10 may utilize other known communication protocols or protocols which have not yet been developed for communicating over the air interface. Further, vehicle safety system 10 may include a human interface 24, coupled to CPU 12, for communicating information between vehicle safety system 10 and a driver of the vehicle. Human interface 24 may include a display panel, such as a touch screen display panel, in which information is visually communicated to the vehicle driver from CPU 12, and in which information is provided from the vehicle driver to CPU 12. Human interface 24 may further include a speaker and microphone for providing audible communication between the vehicle driver and CPU 12.

It is understood that the particular structure and/or implementation of CPU 12, memory 14, sensors in sensor network 16, and transceiver 22 are well known such that a detailed description of each will not be provided herein for reasons of simplicity.

Figure 2:
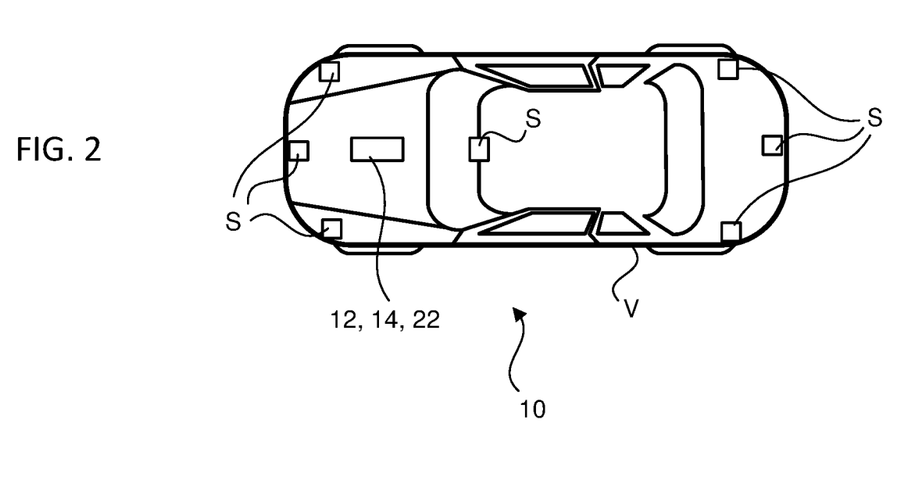
FIG. 2 is a top view of a vehicle having therein the vehicle safety system of FIG. 1.
Figure 3:
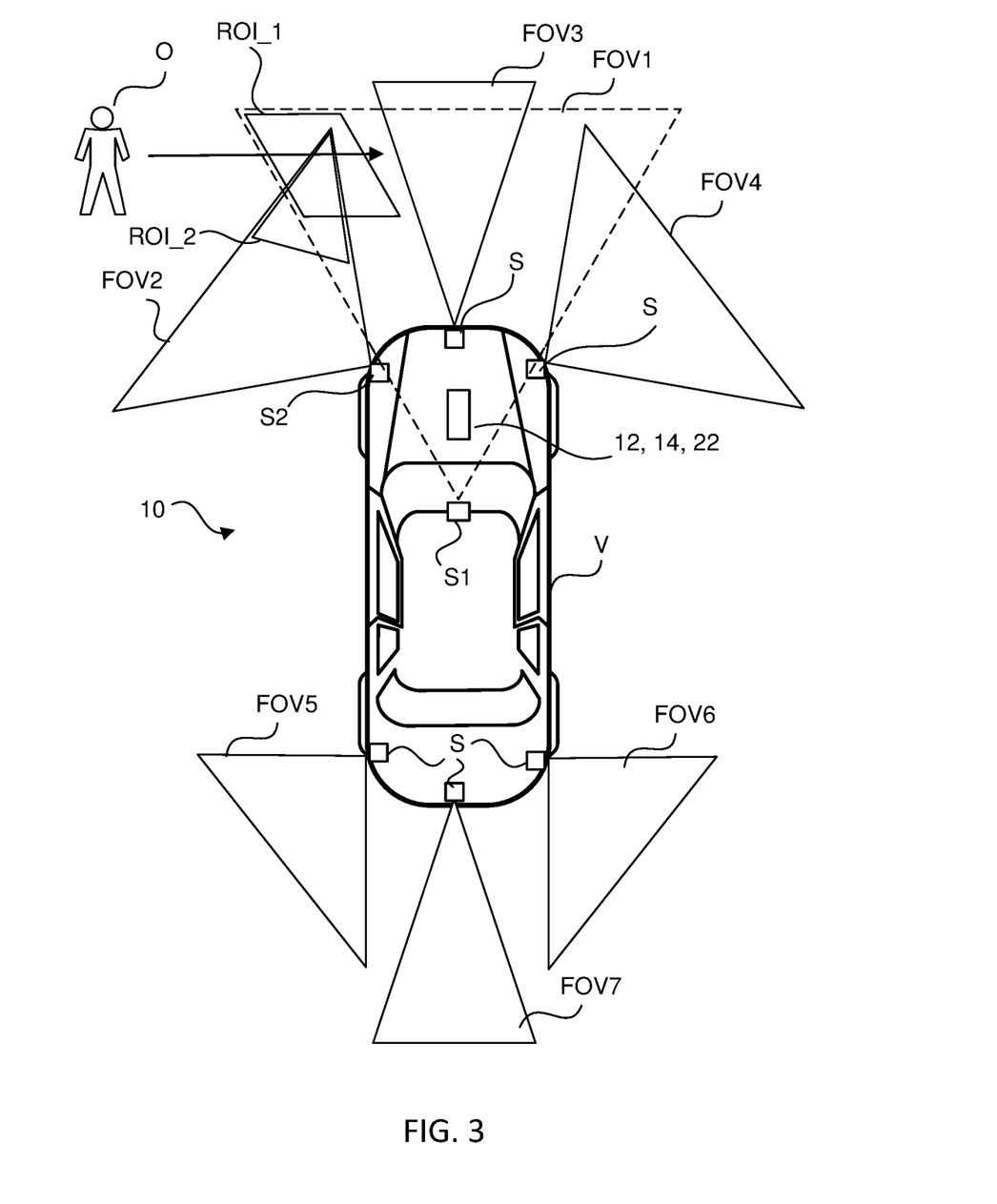
FIG. 3 is a top view of the vehicle of FIG. 2 illustrating the fields of view of sensors of the vehicle safety system.

FIG. 2 illustrates a vehicle V in which vehicle safety system 10 is installed. As shown in FIG. 2, sensors S of sensor network 16 may be disposed in various locations within and/or around vehicle V for detecting objects in each sensor's field of view. FIG. 3 illustrates vehicle V showing the field of view FOV1-FOV7 for sensors S of sensor network 16. As can be understood, each sensor S, like all sensors, has a limited field of view. It is understood that the fields of view FOV of sensors S depicted in FIG. 3 are not drawn to scale relative to the size of vehicle V or to each other, and instead are simply representative for purposes of describing system 10 and the operation thereof.

In general terms, system 10 is configured to detect and identify objects sensed by sensors S of sensor network 16, and to take action in response in order to ensure the objects are avoided by vehicle V. The action taken by system 10 may depend upon the type of vehicle V. If vehicle V is an autonomous vehicle, the action taken may be to cause vehicle V to avoid the identified object, such as controlling braking of vehicle V and/or steering thereof. If vehicle V is not an autonomous vehicle, the action taken by system 10 may include alerting the driver of vehicle V of the presence and location of the identified object via human interface 24, and possibly causing vehicle V to brake or steer away from the object if the driver fails to timely take action to prevent vehicle V from colliding with the object.

In example embodiments, system 10 will not take any action to avoid an object based solely upon information received via V2V and V2X transmissions. With sensors S having limited fields of view FOV, system 10 is thus unable to sense, detect and identify an object until the object is in the field of view FOV of at least one sensor S. Once an object has entered the field of view FOV of one or more sensors S, additional time is needed to scan, detect and identify an object before vehicle V and/or the driver thereof can respond. Advantageously, system 10 is configured to lessen the total time needed to scan, detect and identify an object, as described in greater detail below.

According to example embodiments, system 10 is configured to receive information about objects which are approaching vehicle V and/or the path thereof. The information may be received via V2V communication and/or V2X communication over the air interface. Specifically, another vehicle or a device forming part of the V2X infrastructure may sense, detect and identify/classify an object O in the field of view thereof. In an example embodiment, the vehicle/infrastructure device automatically broadcasts information pertaining to the object O, such as the object's location, the object's classification and/or object type (e.g., pedestrian, bicyclist, etc.), and the direction and speed of the object O if the object is moving. The broadcasted object information may then be received by any vehicle or other device within the communication range of the vehicle/infrastructure device which broadcasted the object information. In another embodiment, the vehicle/infrastructure device may determine that the object O may soon enter the field of view FOV of a sensor S of vehicle V and send the object information specifically to vehicle V. Once the object information is received by vehicle V, action normally taken to sense, detect and identify (i.e., classify) objects within the field of view FOV of sensors S is modified to sense, detect and identify the object about which the received information is directed.

Figure 4:
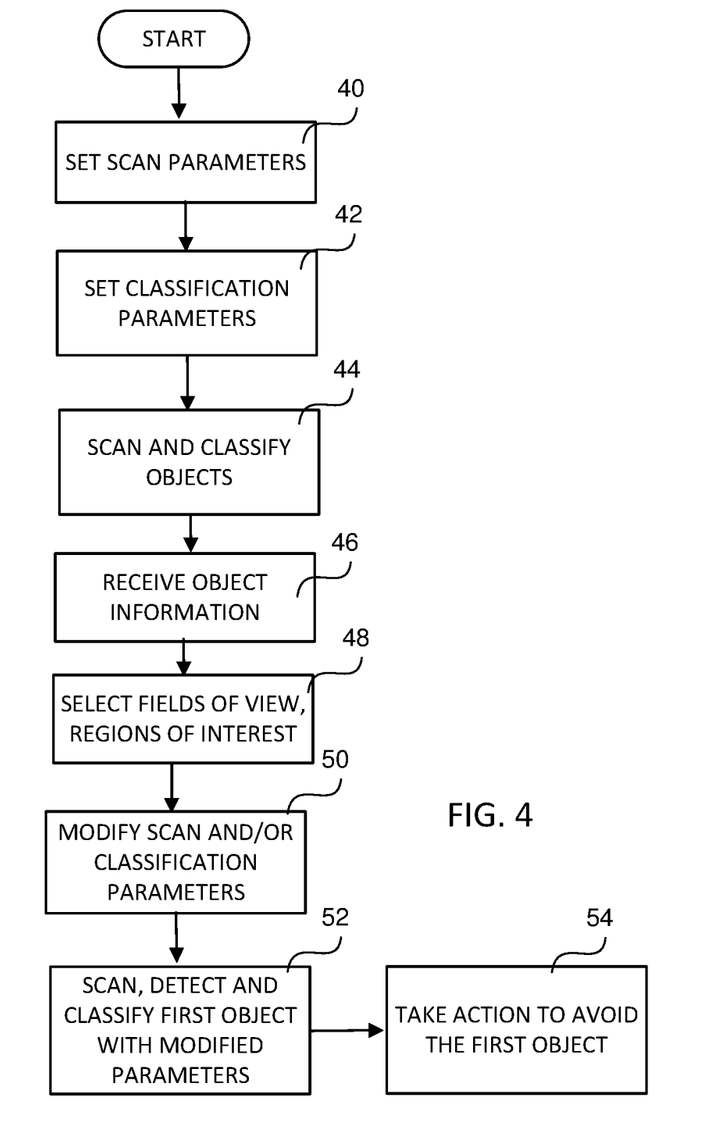
FIG. 4 is a flowchart illustrating the operation of the vehicle safety system of FIG. 1, according to an example embodiment.

FIG. 4 is a flowchart describing the operation of system 10 according to an example embodiment. Initially, CPU 12 sets at 40 the scan parameters for each sensor S. The scan parameters are those settings which are used in controlling sensor S, and particularly may include controls for controlling the way in which the pixels, which form sensor S, are accessed. In other words, the scan parameters are those settings used in controlling the way in which the sensor data from sensor S is scanned and/or analyzed. In this case, the scan parameters may be default parameters for detecting any object appearing in any portion of the field of view FOV of sensor S. At 42, CPU 12 sets the classification parameters for use by CPU 12 to classify/identify a sensed and detected object as belonging to any one of a plurality of classes and/or types of objects. In an example embodiment, object classes may be assigned weights, with an object class in which an object is more likely to be classified being assigned a greater weight, compared to a weight assigned to an object class in which it is less likely the object will be classified. The weights given to object classes may vary based upon, for example, the particular environment in which vehicle V is located. In this case, the classification parameters may assign default weight values to the object classes consistent with the current environment of vehicle V. With the scan parameters and the classification parameters set, vehicle V begins scanning at 44 for objects within the fields of view FOV of sensors S. With each object in the field of view FOV of at least one sensor S, such object is scanned according to the default scan parameters, detected, and classified according to the default classification parameters. Vehicle V may take action responsive to the detection and classification of the object if CPU 12 determines that action is needed.

At 46, CPU 12 receives information about an object O which is not currently in the fields of view FOV of sensors S of system 10 but may soon appear therein. The object information may be received from another vehicle using V2V communication or an infrastructure device using V2X communication. The vehicle/infrastructure device may detect the object O within its own field of view and send the object information as a broadcast signal or as a signal specifically addressed to vehicle V, as described above. In the event the object O was classified by the vehicle/infrastructure device which broadcasted the object information, the object information may include the object class corresponding to the object O. The object information may also include location information of the object O and, to the extent that the object O is moving, the direction of travel and traveling speed of the object O.

Having received the object information at 46, system 10 now has information about an object (object O) which may soon enter the field of view FOV of one or more sensors S of system 10. With such object information, system 10 modifies the operation of sensors S in generating sensor data and/or the operation of CPU 12 in detecting and identifying object O from the sensor data, so that less time is spent by system 10 to detect and identify object O, thereby leaving more time for vehicle V and/or the driver thereof to take necessary action to avoid colliding with object O. CPU 12 may generally focus on and look for object O in the sensor data generated by sensors S in a smaller region of interest in the sensor data based upon information received about object O in step 46. In an example embodiment, CPU 12 may perform at 48 a number of determinations for more quickly responding to object O. For instance, CPU 12 may identify the sensor(s) S in whose field(s) of view FOV the object O will first appear, based upon the location, direction of travel and traveling speed of object O in the received object information. In this case, sensors S1 and S2 are identified as having fields of view FOV1 and FOV2, respectively, which object O will first enter, as shown in FIG. 3. CPU 12 may also determine regions of interest ROI in the identified fields of view FOV1 and FOV2 in which the object O will likely appear within each identified field of view FOV.

The location, size and shape of the determined regions of interest ROI may vary based upon a number of factors, including the classification of object O, the distance between of object O and vehicle V, the travelling speed (if any) of object O, etc., all of which may be included in the received object information or derived therefrom. For example, if the distance between object O and vehicle V is determined to be relatively far away, the region of interest ROI in a field of view FOV may be smaller and located in the field of view FOV farther from vehicle V, compared to object O being a shorter distance to vehicle V (which results in a larger region of interest ROI which is closer to vehicle V in the corresponding field of view FOV).

With such field of identifications, CPU 12 changes at 50 the sensing by sensors S and the classifying by CPU 12 so as to more quickly detect and identify, respectively, the object O. Specifically, in an example embodiment CPU 12 modifies the scan parameters, the classification parameters, or both the scan parameters and the classification parameters at 50. The scan parameters for scanning/sensing sensors S may be modified to give greater focus to the fields of view FOVs of sensors S in which the object O will first appear, thereby changing how the sensor data is scanned and/or analyzed. With respect to FIG. 3, CPU 12 may determine that the object O will first appear in a first field of view FOV1 of sensor S1 and a second field of view FOV2 corresponding to sensor S2. Accordingly, CPU 12 may give greater focus to scanning fields of views FOV1 and FOV2 of sensors S1 and S2, respectively, over the fields of view FOV4, FOV5, FOV6 and FOV7 of other sensors S. This may be realized, for example, by only scanning with sensors S1 and S2, or scanning with sensors S1 and S2 more frequently than scanning with the other sensors S. Alternatively, this may be realized by scanning all of the sensors of system 10 normally, but accessing the sense data from sensors S1 and S2 exclusively or more frequently for detecting object O more quickly. Each of these approaches results in changing the way in which the sensor data is scanned or otherwise analyzed.

In addition, CPU 12 may give greater focus to the previously identified region of interest ROI within each field of view FOV1 and FOV2. For instance, and referring again to FIG. 3, region of interest ROI_1 within field of view FOV1 may receive greater focus than other regions thereof; and the most forward region of field of view FOV2, relative to vehicle V, may be a region of interest ROI_2 with greater focus. CPU 12 modifies the scan parameters for sensors S1 and S2 to account for these regions of interest ROI. This greater focus may be realized, for example, by exclusively or more frequently scanning the pixels of sensors S1 and S2 which are associated with their respective regions of interest ROI, relative to scanning pixels associated with other regions of fields of view FOV1-FOV2. Additionally or alternatively, the focus may be realized by scanning all of the sensors S of system 10 normally, but accessing the sense data from regions of interest ROI_1 and ROI_2 exclusively or more frequently for more quickly detecting object O. Each of these approaches results in changing the way in which the sensor data is scanned or otherwise analyzed. It is understood that other approaches may be utilized for focusing on regions of interest ROI in the fields of view FOV of sensors S1 and S2.

FIG. 3 depicts regions of interest ROI_1 and ROI_2 as having certain shapes and sizes. It is understood that such regions of interest ROI may have different shapes and sizes within their respective fields of view FOV. In another example embodiment, a cumulative field of view from combining some or all fields of view of sensors S may be defined, from which a single region of interest ROI may be identified by CPU 12.

As mentioned, at 50 CPU 12 changes classification parameters for classifying object O so that object O is classified and/or identified more quickly following its detection in the field(s) of view FOV of sensors S. For example, if the received object information pertaining to object O identifies object O by the classification thereof, the object class of object O may be given greater preference when CPU 12 classifies object O. In an example embodiment, each object class is associated with a weight, and such weights are modified based upon the particular classification of object O in the received object information. For instance, if the received object information is that object O is classified as a pedestrian, then the pedestrian class may be given a higher weight by CPU 12 relative to other object classes. The amount of the weight increase may depend upon other things, such as the amount of time available to sense, detect and classify the object before action needs to be taken. Alternatively, CPU 12 may skip classifying object O altogether and assign the object class to object O included in the received object information.

With the scanning parameters and/or classification parameters modified in step 50, at 52 CPU 12 controls sensors S of system 10 based upon the modified scan parameters, and generates sense data. Alternatively or additionally, CPU 12 does not change the control of sensors S (and the sensor data generated thereby) and instead modifies the access of the sense data based upon the modified scan parameters. In addition, at 52 CPU 12 analyzes the sensor data based upon the modified scan parameters, and detects at 52 the object O in the sensor data and classifies the detected object O based upon the modified classification parameters. By focusing selected sensors S on regions of interest ROI and by more heavily weighting an object class over other object classes based upon the received object information, the time spent by CPU 12 scanning for object O, detecting object O in the sense data, and classifying the detected object O is significantly reduced, thereby reducing the amount of time before system 10 is able to respond for avoiding colliding with object O. Thereafter, CPU 12 may take action at 54 as needed in response to the detection of the object O. As discussed above, such action may be, if the vehicle V is an autonomous vehicle, causing the vehicle V to steer away from the object O, to cause the vehicle to brake, or to both steer away from and brake so as to avoid hitting the object O by the vehicle V. If the vehicle is not an autonomous vehicle, CPU 12 may cause the driver of the vehicle V to be alerted as to the presence of the object O. Such alert may be a visual alert, such as displaying a visual message on the display panel of human interface 24, an audible alert using the speaker of human interface 24, or both a visual alert and audible alert.

In the example embodiments discussed above, CPU 12 is described as controlling sensors S for generating sensor data from which CPU 12 detects and identifies object O. It is understood that any sensor S may include a processor or processing device and memory for additionally detecting objects in the sensor's field of view, and optionally classifying detected objects. In this case, with each sensor S having object detection and classifying functionality, most if not all of the operation of system 10 as described above and depicted in FIG. 4 is performed by the sensors S.

In another example embodiment, a cumulative field of view from combining some or all fields of view of sensors S may be defined, from which a single region of interest ROI may be identified by CPU 12. The sense/scan operations of sensors S and CPU 12 may be modified to give greater weight to the single region of interest ROI, and the operation of CPU 12 may be modified to give greater weight to detecting object O from the sensor data (generated by sensors S) corresponding to the single region of interest ROI.

Vision based sensors in vehicles have fields of view and each scans its entire field of view for any objects of interest. With the use of sensors at infrastructure devices or on other vehicles, a vehicle V may get the information of objects which is not currently in the fields of view of sensors S of the vehicle V but will soon enter into the sensors' fields of view. With this information, the vehicle's system 10 will know from which direction the object of interest will enter the fields of view of the sensors S and may start scanning from that direction or may have a region of interest ROI identified before the object even enters in the fields of view of the sensors S. This will reduce the time taken by sensors S and/or system 10 to detect and classify the objects and will increase the confidence of detection. With more information vehicle V receives from another vehicle and/or from an infrastructure device (e.g., object position, object type, direction of travel, etc.), sensors S and/or system 10 will be faster and more accurate in detecting objects of interest. Such information of the object and/or road user and how far the object/user is from vehicle V may also be used to determine the region of interest ROI. The farther the object/road user is, the region of interest ROI will be higher and smaller, and lower and larger if the object/road user is closes to the vehicle V. Here, the region of interest ROI may be determined by CPU 12 before the object of interest enters the field of view of sensors S of system 10.

Vehicle V has its sensors S, e.g., a camera, radar, etc., provide 360 degree (or nearly 360 degree) view. Sensors S have fields of view FOV and cannot see too far from vehicle V. Sensors S look at everything in their field of view FOV to detect and classify objects. This generally takes some time. Vehicle V may not take any action based only on V2V or V2X communicated information. However, this communicated information can reinforce the detection by sensors S and/or system 10. With information from V2V and V2X communication, vehicle V may know from which direction (e.g., left or right) the object O (e.g., vehicle, road user, etc.) is about to enter into the field of view FOV of one or more sensors S. With such information, sensors S focus on that direction in their field of view FOV for the region of interest ROI and this will reduce the time taken by sensors S to detect and classify the new objects entering the field of view FOV of the sensors S.

In one example scenario, a pedestrian is not in the field of view FOV of sensors S of system 10. Some other vehicle or infrastructure object detects the pedestrian and broadcasts this information. System 10 of vehicle V receives the broadcasted information and is thus aware that something may enter its field of view FOV (from the left in this case) and starts looking for objects in the left side of the frame. With more information provided by the other vehicle or infrastructure device, such as, for example, object position, object type, direction of travel, sensors S and/or CPU 12 of vehicle V will be faster and more accurate in detecting.

V2V, V2X communicated information of the object/road user and how far the object/user is from the vehicle can also be used to determine the region of interest ROI. The farther the object is from vehicle V, the region of interest ROI should be higher and smaller with respect to the field of view, and lower and larger if the object is closer to vehicle V.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. In a vehicle system including at least one sensor having at least one field of view, a method of identifying an object, comprising:
  setting scan parameters for at least one of scanning and analyzing sensor data of the at least one sensor;
  setting classification parameters for identifying objects in the sensor data corresponding to the at least one field of view of the at least one sensor;
  controlling the at least one sensor to generate the sensor data;
  at least one of scanning and analyzing the sensor data for objects in the at least one field of view using the scan parameters, and based upon the at least one of scanning and analyzing, identifying the objects in the at least one field of view using the classification parameters;
  receiving information relating to a first object which is not in the at least one field of view of the at least one sensor but is expected to enter the at least one field of view thereof;
  modifying the scan parameters based upon the received information;
  controlling the at least one sensor to generate new sensor data;
  at least one of scanning and analyzing the new sensor data using the modified scan parameters, and based upon the at least one of scanning and analyzing the new sensor data, identifying the first object in the at least one field of view, wherein the first object is identified in a shorter period of time, relative to the first object first appearing in the at least one field of view of the at least one sensor, than a period of time to identify the first object without having modified the scan parameters; and responsive to identifying the first object, performing one or more actions so the vehicle avoids the first object.

2. The method of claim 1, further comprising, following receiving the information, modifying the classification parameters based upon the received information, wherein identifying the first object is based upon the modified classification parameters.

3. The method of claim 2, wherein the information relating to the first object identifies the first object by a first object class, and modifying the classification parameters comprises modifying the classification parameters to identify the first object as corresponding to the first object class.

4. The method of claim 3, wherein modifying the classification parameter comprises increasing a weight assigned to the object class in the information relating to the first object, relative to one or more weights of other object classes not included in the information relating to the first object.

5. The method of claim 1, wherein the information relating to the first object includes location information thereof, the at least one sensor comprises a plurality of sensors, each sensor having a field of view such that the at least one field of view comprises a plurality of fields of view, and the method further comprises identifying, based in part upon the location information of the first object, a first field of view from the fields of view in which the first object is expected to first appear, wherein modifying the scan parameters is based in part upon the identified first field of view.

6. The method of claim 5, the method further comprises identifying a region of interest in the first field of view based upon the location information, the region of interest defining a region within the first field of view in which the first object is expected to appear, and modifying the scan parameters is based in part upon the identified region of interest.

7. The method of claim 6, wherein controlling the at least one sensor to scan comprises more frequently scanning or accessing pixels of the sensor corresponding to the region of interest, relative to scanning pixels corresponding to other regions of the first field of view.

8. The method of claim 5, wherein controlling the at least one sensor to scan comprises controlling the sensors to more frequently scan or access the sensor having the first field of view, relative to scanning or accessing other of the sensors.

9. A program code product for a vehicle, the program code product stored in non-transitory memory and including instructions which, when executed by a processor in the vehicle having at least one sensor, configure the processor to perform:
setting scan parameters for scanning, with the at least one sensor, objects in at least one field of view of the at least one sensor;
setting classification parameters for identifying objects scanned in the at least one field of view of the at least one sensor;
controlling the at least one sensor to generate scan data;
scanning the scan data for objects in the at least one field of view using the scan parameters, and to identify any scanned objects based upon the classification parameters;
receiving information relating to a first object which is not in the at least one field of view of the at least one sensor but is expected to enter the at least one field of view thereof;
modifying the scan parameters based upon the received information, and controlling the at least one sensor to generate new scan data scan based upon the modified scan parameters;
scanning the new scan data and identifying the first object in the at least one field of view, wherein the first object is identified in a shorter period of time, relative to the first object appearing in the at least one field of view of the at least one sensor, than a period of time to identify the first object without having modified the scan parameters; and
responsive to identifying the first object, acting to avoid hitting the first object with the vehicle.

10. The program code product of claim 9, wherein the instructions, when executed by the processor, configure the process for, following receiving the information, modifying the classification parameters based upon the received information, wherein identifying the first object is based upon the modified classification parameters.

11. The program code product of claim 10, wherein the information relating to the first object identifies the first object by object class, and modifying the classification parameters comprises modifying the classification parameters to identify the first object with less processing time by the system than a processing time to classify the first object without the modified classification parameters.

12. The program code product of claim 11, wherein modifying the classification parameter comprises increasing a weight assigned to the object class in the information relating to the first object, relative to one or more weights of other object classes not included in the information relating to the first object.

13. The program code product of claim 9, wherein the information relating to the first object includes location information thereof, the at least one sensor comprises a plurality of sensors, each sensor having a field of view such that the at least one field of view comprises a plurality of fields of view, and the processor is further configured to identify, based in part upon the location information of the first object, a first field of view from the fields of view in which the first object is expected to first appear, wherein modifying the scan parameters is based in part upon the identified first field of view.

14. The program code product of claim 13, wherein the processor is further configured to identify a region of interest in the first field of view based upon the location information, the region of interest defining a region within the first field of view in which the first object is expected to appear, and modify the scan parameters is based in part upon the identified region of interest.

15. The program code product of claim 14, wherein controlling the at least one sensor to scan comprises more frequently scanning or accessing the new sensor data corresponding to the region of interest, relative to scanning the new sensor data corresponding to other regions of the first field of view.

16. The program code product of claim 13, wherein controlling the at least one sensor to scan comprises more frequently scanning or accessing the new sensor data corresponding to the sensor having the first field of view, relative to scanning or accessing other of the sensors.

17. A vehicle safety system configured for use in a vehicle, comprising:
a transceiver having a transmitter and a receiver to provide over-the-air communication;
at least one sensor; and
a processor and memory coupled to the processor, the processor coupled to the transceiver and the at least one sensor, and the memory having stored therein a software program having instructions which, when executed by the processor, configure the processor to perform:

setting scan parameters for scanning, with the at least one sensor, objects in at least one field of view of the at least one sensor;

setting classification parameters for identifying objects scanned in the at least one field of view of the at least one sensor;

controlling the at least one sensor to scan for objects in the at least one field of view using the scan parameters, and identifying any scanned objects based upon the classification parameters;

receiving information relating to a first object which is not in the at least one field of view of the at least one sensor but is expected to enter the at least one field of view thereof;

modifying the scan parameters based upon the received information, and controlling the at least one sensor to generate scan data;

scanning the scan data based upon the modified scan parameters, and identifying the first object in the at least one field of view, wherein the first object is identified in a shorter period of time, relative to the first object appearing in the at least one field of view of the at least one sensor, than a period of time to identify the first object without having modified the scan parameters; and responsive to identifying the first object, taking action to avoid the vehicle contacting the first object.

18. The system of claim 17, wherein the processor is further configured to perform, following receiving the information, modifying the classification parameters based upon the received information, wherein identifying the first object is based upon the modified classification parameters, and wherein the information relating to the first object identifies the first object by object class, and modifying the classification parameters comprises modifying the classification parameters to identify the first object with less processing time by the system than a processing time to classify the first object without the modified classification parameters.

19. The system of claim 17, wherein the information relating to the first object includes location information thereof, the at least one sensor comprises a plurality of sensors, each sensor having a field of view such that the at least one field of view comprises a plurality of fields of view, and the processor is further configured to perform identifying, based in part upon the location information of the first object, a first field of view from the fields of view in which the first object is expected to first appear, wherein modifying the scan parameters is based in part upon the identified first field of view.

20. The system of claim 19, wherein controlling the at least one sensor comprises more frequently scanning or accessing the sensor data of the sensor corresponding to the first field of view, relative to scanning or accessing other of the sensors.

* * * * *